April 19, 1938.  H. J. LONG  2,114,666
AUTOMATIC TEMPERATURE CONTROL DEVICE
Original Filed June 7, 1936
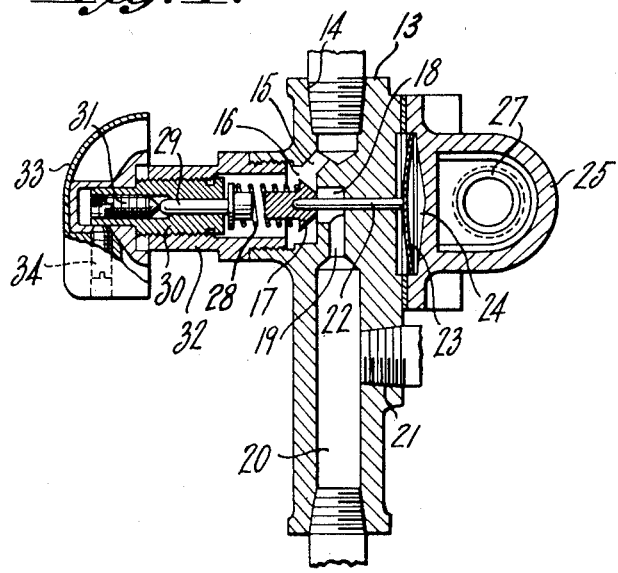
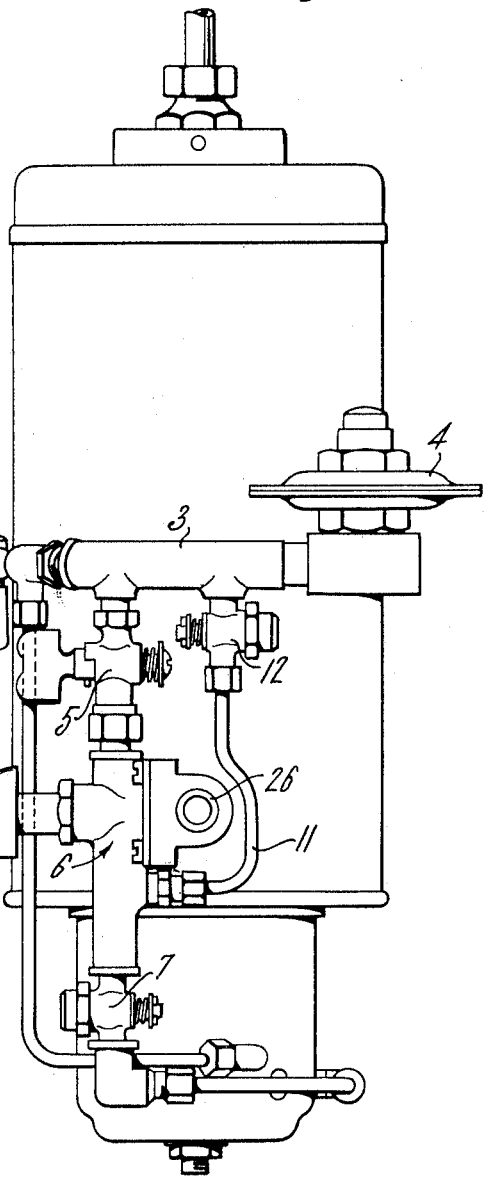
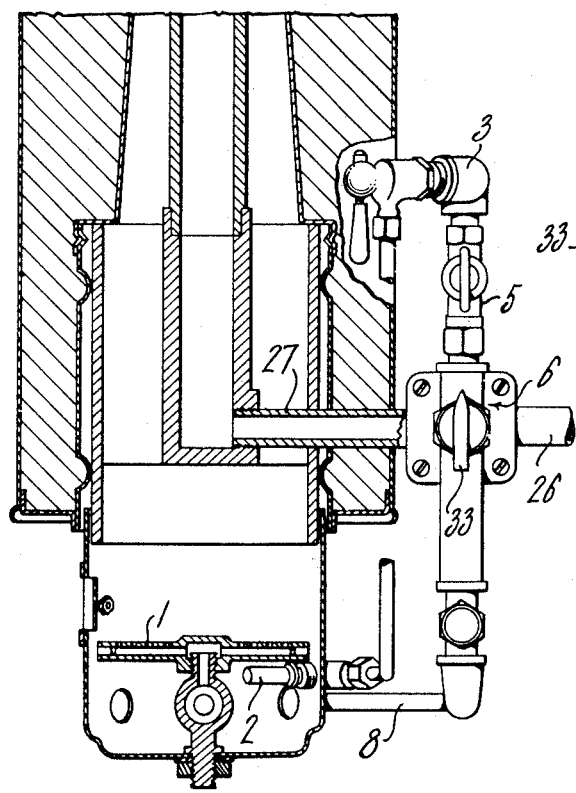
INVENTOR.
*Herbert J. Long*
BY
*Don A. Rosenthal*
ATTORNEY.

Patented Apr. 19, 1938

2,114,666

UNITED STATES PATENT OFFICE 2,114,666

AUTOMATIC TEMPERATURE CONTROL DEVICE

Herbert J. Long, Springfield, Mass., assignor to United American Bosch Corporation, Springfield, Mass., a corporation of New York Original application June 7, 1936, Serial No. 87,703. Divided and this application October 10, 1936, Serial No. 104,954

2 Claims. (Cl. 236—32)

This invention, which is a division of my original application Serial No. 87,703, filed June 27, 1936, relates to an automatic temperature control device for a water heater and has for its principal object to provide a control device which is easily constructed and which may be easily assembled and disassembled for repair or inspection.

It is a further object to provide a device of this type which may be readily adjusted for different service conditions.

Further objects and details of the invention will be more apparent to those skilled in the art from a consideration of the following detailed description taken in conjunction with the accompanying drawing, in which:

Fig. 1 is a longitudinal section through the control device; Fig. 2 is a side elevation of a water heater to which the control device has been applied; and Fig. 3 is a view showing a portion of the water heater in section with parts in side elevation.

Referring to the drawing, a burner 1 and a lighting torch 2 are supplied with gas from a gas manifold 3, the flow to which is controlled by a pressure regulator 4. From the manifold 3, the gas flows by way of a stop cock 5, a thermostatic control device 6 (which will be hereinafter more particularly described), a flow cock 7, and a burner tube 8. It will be understood that a safety cut off device responsive to the heat of the burner may be interposed in the connections between the tube 8 and the burner 1 in order to cut off the supply of gas to the burner in case the pilot flame thereof should be extinguished. A suitable arrangement of this kind is shown in the original application above mentioned but forms no part of the present invention.

A pipe 11 is connected by way of flow cock 12 to manifold 3 and extends to the fuel line of the main burner at a point beyond the valve of the control device 6. A by-pass is thus provided around this device to maintain a low pilot flame at the burner 1 when the main supply thereto is cut off by the control device.

The thermostatic control device 6 which regulates the flow of fuel to the burner 1 in accordance with the temperature of the water comprises a casting 13 having at one end a short bore 14 which is internally threaded to receive a connection leading from the gas cock 5. An angular bore 15 affords communication between the inner end of bore 14 and a valve chamber 16. A valve 17 in chamber 16 controls a passage formed by an enlarged portion of a bore 18 extending centrally from valve chamber 16. A longitudinal bore 20 in an extension of the casting 13 has a reduced portion 19 connecting with the passage formed by bore 18. A lateral opening 21 provides for a connection between by-pass tube 11 and bore 20. A stem 22 which extends through the bore 18, making a sliding fit with the reduced portion of the latter, carries the valve 17 on one end thereof and its opposite end rests on a disk thermostat 23. This disk is positioned in a chamber 24 formed between the casting 13 and a member 25 which forms a union between a lower tank connection 26 and a tube 27 which leads to the heating unit. A spring 28 between the valve 17 and a plunger 29 urges the valve toward closed position. The plunger 29 has a sliding fit in sleeve 30 within which it is longitudinally adjustable by means of a screw 31. The sleeve 30 is externally threaded to coact with internal threads on an outer surrounding sleeve 32. A cap 33 fits on the upper, reduced end of sleeve 30 and is prevented from movement relative to the sleeve by means of a set screw 34. The arrangement of these parts is such that adjustments of the thermostat, such as those made while the heater is first tested or while it is being serviced, may be made by removing cap 33 and adjusting screw 31. This permits such course adjustments as are necessary in adapting the device to gases of greatly different heat content. Adjustments such as the user may desire to make in changing from warm to hot water are made by twisting the cap 33.

It will be seen that by the above arrangement I have provided a control device for a fluid heater which is responsive to the temperature of the fluid heated to control the fuel supply thereto and which is provided with dual regulating means one of which is suitable for primary adjustment of the device such as settings for fuels of different heat content while the other is suitable for use in making ordinary adjustments such as between hot and warm water. It will also be seen that in positioning the thermostat between the valve casing and one of the water connections of the heater, I have eliminated separate parts for housing this member and placed the same in direct contact with one of the water conduits, thus simplifying its structure and rendering it more sensitive.

While there is herein disclosed but a single embodiment of my invention, other embodiments within the scope of the appended claims will be obvious to those skilled in the art.

Having thus described the invention, what is claimed as new is:

1. A thermostat controlled valve including a housing, a valve within said housing, a thermostat adapted to act upon one side of said valve to open the same, a spring acting in a closing direction upon the opposite side thereof, means to adjust the tension of said spring including a screw plug having a central bore, a stem slidably mounted in said bore and acting at one end on said spring and an adjusting screw threaded in the opposite end of said bore for adjusting the relative position of said stem in said plug, whereby either rotation of said plug or rotation of said screw provides an adjustment of the tension of said spring without angular reaction of said spring upon said screw.

2. A thermostatic device including a casing having a valve seat therein, a valve cooperative with said seat, a thermostat positioned on one side of said valve to open the same, a stem operatively connecting said thermostat and said valve, a spring acting in a closing direction on the opposite side of said valve, means to adjust the tension of said spring including a screw plug having a central bore, a stem slidably mounted in said bore and having at one end a head contacting said spring, means to adjust the position of said stem in said bore, and separate means to adjust the position of said plug relative to said casing, whereby rotation of said screw plug provides an adjustment of the tension of said spring without angular reaction of said spring upon said stem adjusting means.

HERBERT J. LONG.